(12) United States Patent
Chuntonov

(10) Patent No.: US 9,095,805 B2
(45) Date of Patent: Aug. 4, 2015

(54) SORPTION APPARATUSES FOR THE PRODUCTION OF PURE GASES

(75) Inventor: Konstantin Chuntonov, Nesher (IL)

(73) Assignee: Reactive Metals Ltd. (KR)

( * ) Notice: Subject to any disclaimer, the term of this patent is extended or adjusted under 35 U.S.C. 154(b) by 152 days.

(21) Appl. No.: 13/994,342

(22) PCT Filed: Dec. 11, 2011

(86) PCT No.: PCT/IL2011/000933
§ 371 (c)(1),
(2), (4) Date: Jun. 14, 2013

(87) PCT Pub. No.: WO2012/081004
PCT Pub. Date: Jun. 21, 2012

(65) Prior Publication Data
US 2013/0294988 A1    Nov. 7, 2013

Related U.S. Application Data

(60) Provisional application No. 61/457,038, filed on Dec. 15, 2010.

(51) Int. Cl.
*B01D 53/04* (2006.01)
*B01D 53/00* (2006.01)
(Continued)

(52) U.S. Cl.
CPC ............. *B01D 53/00* (2013.01); *B01D 53/02* (2013.01); *B01D 53/83* (2013.01); *B01J 20/02* (2013.01);
(Continued)

(58) Field of Classification Search
CPC ........ B01D 53/00; B01D 53/02; B01D 53/83; B01D 2256/18; B22F 9/04; B01J 20/02; B01J 20/0207; B01J 20/04; B01J 20/28042; B01J 20/30; B01J 20/3021; B01J 2220/58
USPC ........ 96/115, 116, 134, 138, 150, 151; 95/13, 95/107, 108; 502/439
See application file for complete search history.

(56) References Cited

U.S. PATENT DOCUMENTS 5,312,606 A    5/1994  Boffito et al.
5,312,607 A *  5/1994  Schiabel et al. ............. 423/210
(Continued)

FOREIGN PATENT DOCUMENTS

WO      2011/145090     11/2011
WO   WO 2012/081004     6/2012

OTHER PUBLICATIONS

Arthur Adamson, "Physical Chemistry of Surfaces", John Wiley and Sons, University of Southern California, Department of Chemistry, 4th edition, 1982, pp. 1-16.
(Continued)

Primary Examiner — Frank Lawrence
(74) Attorney, Agent, or Firm — Blank Rome LLP

(57) ABSTRACT

A sorption apparatus for gas purification consists of a vertical flow column with gas tight walls, inlet and outlet filters, and a disintegrator producing reactive powder in the medium of the gas to be purified at ambient temperature, i.e. without forced heating or cooling. A process of sorption purification of gas flow using the sorption apparatus, where the reactive powder is produced as needed by mechanical milling of a monolithic ingot structure in the medium of the gas to be purified and a reactive sorption material. The composition of the sorption material corresponds to an eutectic on the basis of a reactive metal Me or an intermetallic compound MenM with a relatively low melting point, where M is the second metal and n 2:1, wherein the sorption material is obtained according to the above process.

17 Claims, 4 Drawing Sheets

Figure 1:
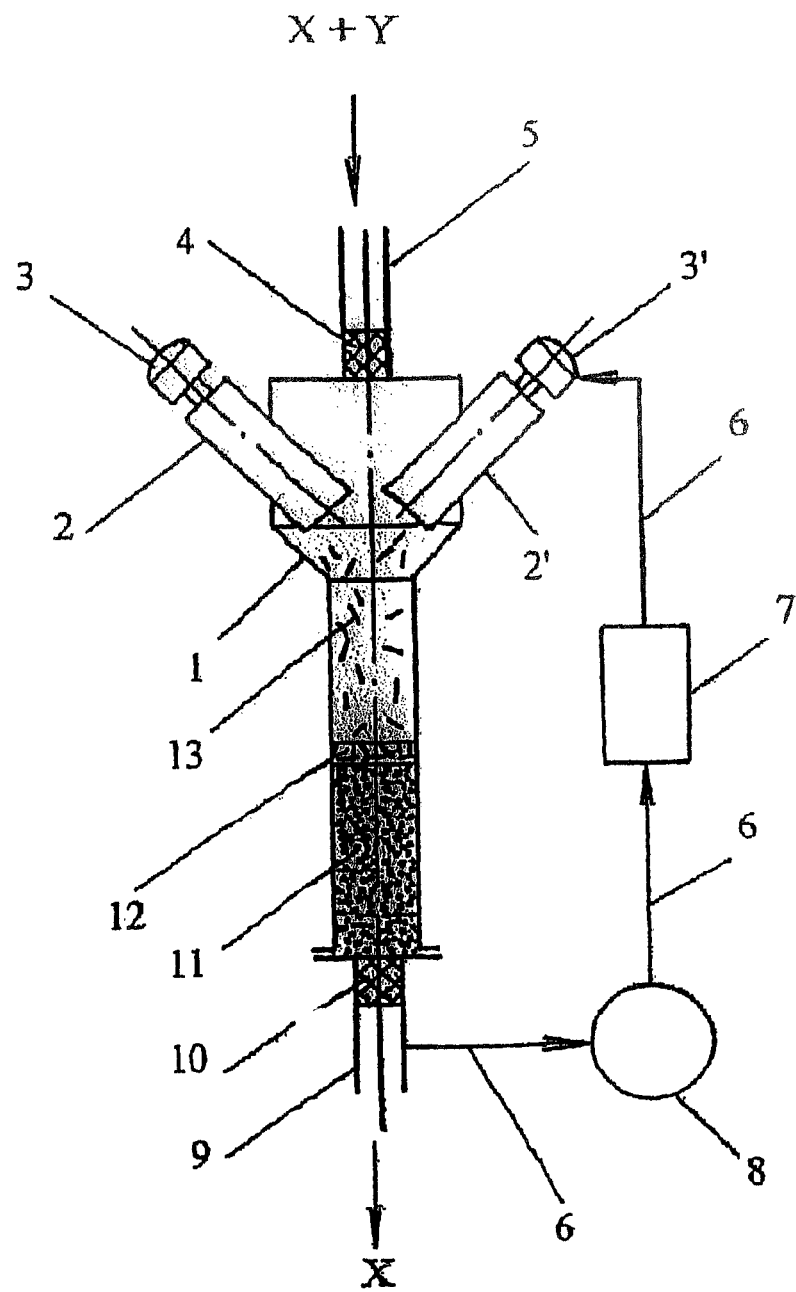

(51) Int. Cl.
*B01D 53/02* (2006.01)
*B01D 53/83* (2006.01)
*B01J 20/02* (2006.01)
*B01J 20/28* (2006.01)
*B01J 20/30* (2006.01)
*B22F 9/04* (2006.01)

(52) U.S. Cl.
CPC ........ *B01J 20/0207* (2013.01); *B01J 20/28042* (2013.01); *B01J 20/30* (2013.01); *B01J 20/3021* (2013.01); *B22F 9/04* (2013.01); *B01D 2256/18* (2013.01); *B01J 2220/58* (2013.01)

(56) References Cited

U.S. PATENT DOCUMENTS

| | | |
|---|---|---|
| 5,885,682 A | 3/1999 | Tanimoto et al. |
| 6,200,494 B1 | 3/2001 | Manini et al. |
| 6,514,430 B1 | 2/2003 | Corazza et al. |
| 7,361,209 B1 * | 4/2008 | Durham et al. ................. 95/107 |
| 2002/0112608 A1 | 8/2002 | Irven et al. |
| 2003/0007883 A1 | 1/2003 | Toia et al. |
| 2005/0039598 A1 * | 2/2005 | Srinivasachar et al. ......... 95/134 |
| 2005/0056148 A1 * | 3/2005 | Sweeney et al. ................. 95/90 |
| 2006/0225817 A1 | 10/2006 | Chuntonov |
| 2008/0292512 A1 * | 11/2008 | Kang ............................. 422/172 |
| 2009/0134775 A1 | 5/2009 | Watanabe et al. |
| 2009/0215610 A1 | 8/2009 | Kullberg et al. |
| 2011/0217491 A1 | 9/2011 | Chuntonov |

OTHER PUBLICATIONS

Chuntonov et al., "Getter films with a reactive component", Vacuum. vol. 85, 2011, pp. 755-760.

Chuntonov et al., "The Cs-In Phase Diagram", Journal of the Less-Common Metals, vol. 83, 1982, pp. 145-153.

International Search Report for international application No. PCT/IL2011/000933, dated May 16, 2012.

* cited by examiner

SORPTION APPARATUSES FOR THE PRODUCTION OF PURE GASES

I. FIELD OF INVENTION

The invention refers to the technology of production of super pure gases, in particular as applied to gas streams, with the help of sorption of gaseous impurities employing novel sorption materials and a novel purification process.

II. BACKGROUND

The traditional getter technologies are expensive [R. Kullberg et al, US Pat. Appl. 20090215610, Aug. 27, 2009] and will become still more expensive in the future. In these traditional technologies the alloys of Fe, Ti, V, Zr and other transition metals are used, in a form of high porosity bodies as sorption materials.

Besides the high price the mentioned getters also have the disadvantage that their sorption capacity is negligibly small at room temperature. However, room temperature is the preferred range of temperatures for the purification process and sometimes the only range allowed due to operational restrictions.

These two problems, the high price of the getter material and its unsatisfactory sorption characteristics, are easily overcome with the help of new solutions based on gas sorption by reactive metals, which are mechanically activated at ambient temperature directly in the reaction zone. Mechanochemical activation of the reactive alloys by their milling inside a closed vessel is described in [K. Chuntonov, WO 2011145090, 24 Nov. 2011], where the design and the working principle of sorption pumps used for maintaining vacuum in evacuated chambers are disclosed.

However, the scope of the method of mechanochemical activation of solids reaches beyond the frames of only vacuum applications. It is shown below how the method of milling the alloys in a reaction zone can be adjusted to usage in processes for the purification of gas streams.

III. SUMMARY

The production of fresh reactive powders in a sorption column, where these powders immediately enter the reaction with the undesirable impurity of a gas stream, is a new modification of the known methods of mechanochemistry [K. Meyer. Physikalisch—chemische Kristallographie, VEB Deutscher Verlag für Grundstoffindustrie, Leipzig, 1968; G. S. Khodakov. Physics of Grinding, Izd. Nauka, Moscow, 1972; M. Senna. Mechanochemistry, in: Powder Technology Handbook, Third Edition: Eds.H. Masuda, K. Higashitani, H. Yoshida, CRS Press, Boca Raton, 2006, Ch.2.14, pp. 239-246]. The apparatuses developed by the present inventor for reactions of solids with gases are cheap in production and in operation as compared to existing gas purification techniques, and also possess extremely high sorption parameters. The latter mean that in these apparatuses, due to the new organization of the process, the purification materials react with gases at room temperature to completion reaching the theoretical limit of their sorption capacity.

Sorption apparatuses with mechanical activation of the purification material are arranged and function in the following way: An ingot of the reactive material contained in the crucible used for its growth is introduced into the reaction chamber, which represents by itself a gas impermeable sorption flow column, and is installed in a position providing contact between the ingot surface and the cutting edges of a milling instrument.

The process of milling the ingot to the powder state takes place as a result of applying to it two forces from the side of the instrument, a pressing force P, which is directed along the normal to the surface of the ingot, and a tangential force F, which operates parallel to the ingot surface. This tangential force creates the movement of the ingot in relation to the instrument, or the movement of the instrument in relation to the ingot. The powder formed during the treatment of the ingot drops down and is collected at the bottom part of the column in the form of a layer of super active particles, the average size of which is in the range from one micron to several hundreds of microns. Reactive particles of this size have enough time to react to completion with impurity molecules in the gas stream at room or even lower temperature with a constant or close to constant rate.

The composition of the ingot is selected according to the sorption task. For the purification of noble gases the best purification materials are alloys with a high concentration of barium. They are able to capture all active and low-activity gases at room temperature. For manufacturing super pure active gases, alloys which are inert towards the gases to be purified are required. Many alkali, alkaline earth and rare earth metals, e.g. Na, Li, Mg, Ca, Eu, La, Pr, etc., possess (each one for its group of gases) this kind of sorption selectivity. These elements, from barium to rare earth metals, form the basis of the alloys, which are called reactive alloys in the present document. Their characteristic feature is a special sorption mechanism consisting of a continuous growth of a layer of chemical compounds on the surface of the alloy at room temperature according to a linear or parabolic law. The method presented here for gas purification using mechanical activation of the sorption material is a significant step forward compared with the status of existing technologies in this field. Its main advantages can be summarized as follows:

1. Super Reactivity of Mechanically Activated Bodies.

Powders obtained by mechanical crushing of solid material are oversaturated with various defects. Cold deformation and milling of solids not just increase the total surface area but also inject excess energy into the treated material. In such an excited state the fresh powder mass is super reactive, which manifests itself in an abrupt lowering of the activation barriers both for chemical reactions with gases and for diffusion processes. Temperature thresholds are lowered and processes are enhanced. In the present invention these activation effects are further increased due to the fact that ingots of reactive alloys with a high concentration of alkali, alkaline earth or some rare earth metals are used as sorption materials.

2. Simplicity and Extremely High Efficiency of the Method.

The efficiency, in other words the relative sorption capacity of the purification material, reaches a maximum value in the new method. The fresh powders produced by mechanical milling of reactive alloys have a particle size from one micron to hundreds of microns and are given enough time for reacting with the impurity to completion during the time that the gas travels through the sorption column. The design of the apparatus with its control system contributes to the efficiency of the new technology and allows to find the optimal purification regime for a given flow rate by regulating the milling rate as well as the aerodynamics of the gas stream in the column. In this context the regime of a fluidized bed is important, which combines the two most efficient ways of running chemical processes in gas/solids systems and which is here for the first time adjusted to solving the problems of the production of pure and high purity gases. These two ways are the mechanochemical reactions in the medium gas/solid particles and the turbulent mixing of this medium by gas, which is fed into the sorption column from below. The accelerated sorption kinetics allows in this case using a more coarse quality of the initial powder with an average particle dimension of several hundreds of microns. The design of the apparatus is simple and its operation is cheap. The consumed part of the apparatus consists of a crucible with an ingot having a dense monolithic structure and a melting temperature not higher than 600° C. The ingots are grown with high rate in usual tube furnaces according to the classical ampoule technique with a temperature gradient. This stands in contrast to the expensive current production of sintered powders or multiphase composites with nanoparticles, which requires complex and time consuming processes. The process of milling with the aid of a standard mechanical instrument is also easy, and the ingots with the axial texture are predisposed to brittle fracturing into particles uniform in size due to the mechanical weakness of the constituents of such alloys.

3. Controllable Character of the Sorption Process.

Apparatuses with a mechanical activation of sorption material give a unique possibility to control the sorption process by varying the rate of milling the ingot. In contrast to the current purification technologies, in the method described here the sorption rate of the impurities is a regulated value, which can be adjusted to any flow rate and can be stabilized on a given level using the feedback coupling between the mechanical milling tool and the parameters of the state of the end product. This coupling facilitates the standardization of many processes where pure gases serve as the initial component.

4. Variety of Purification Regimes.

The new method is extremely variable. It maintains the ability to control the process in the whole range of flow rates practically used in gas purification. For physical reasons, this range falls into a number of subranges, and in each of these subranges the purification process runs in its specific way, i.e. is characterized by its own regime.

When the milling mechanism is switched off, the sorption rate is negligibly small as in this case the material can react with gases only on the ingot surface through the impeding layer of products. This regime is a stand-by regime, when the material is in the state of quasi passivation.

The next regime is the regime of minimum purification rates, when the activation of the purification material comes down to the renewal of the ingot surface by removing the reacted surface layer.

At more intensive work of the milling instrument the produced powder consists of fresh metal particles. This is the range of medium purification rates, which is characterized by pronounced stratification of the powder mass in the reaction zone of the apparatus: a thin layer of activated alloy particles is present in the upper part while the lower part of the powder mass consists of the exhausted material. Here two different purification regimes are possible: one of them appears when the gas flows through the column from above downwards, and another one when the gas flows in the opposite direction.

Finally, the fastest purification rates are achieved at the regime of fluidized bed, which appears when the hydrodynamic pressure of the gas fed from below becomes equal to the weight of the powder particles. In this regime the intensive mixing of the reaction mixture gas/particles and the effects of the mechanochemical nature are complementary, making the given regime the top one in output capacity and efficiency.

5. Safety and Convenience in Operation.

Sorption columns of the new type are easily adjusted to any working regime; they have small overall dimensions compared with other gas purification equipment of the same output capacity and also allow reloading the purification material under normal conditions. The process of milling is a routine operation, which does not require heating or cooling, and the reactive ingots are mechanically weak. The advantage of the new sorption apparatuses is their safety for the personnel and also the high stability of the reactive material in the case of an air inlet into the system during breakdowns or maintenance operations. A short contact with air does not seriously damage the ingot because its surface is rapidly covered with a layer of products, which turns the sorption process into a slow diffusion stage. The fraction of material present as powder is practically invulnerable because it mainly consists of the column of the used powder and of a thin layer of the fresh powder on the top. This thin layer will be the only material loss if a breakdown occurs.

The method of mechanochemical activation of the purification material is applicable not only to gases in the gaseous state, but also to gases in the liquified state. Mechanical milling of the ingot can be performed in the medium of gas liquified under high pressure at room temperature or of liquid gas at normal pressure but at lower temperatures including the cryogenic range.

IV. DESCRIPTION OF THE DRAWINGS

FIG. 1. The scheme of the sorption apparatus according to the present invention 1—a gas tight casing of the sorption column, 2 and 2'—disintegrators, 3 and 3'—outside actuators, 4—a filter, 5—an inlet, 6—a feedback line, 7—a controller, 8—a gas analyzer, 9—an outlet, 10—a filter, 11—used powder, 12—a layer of fresh powder, 13—falling particles. When the force F=0, the system is in a stand-by state. If at this stage the gas flow rate is not equal to zero, a thin layer of particles 12 rapidly turns into the end product MeY and the reaction continues with a low rate only on the ingot surface through the impeding layer of MeY product. If the gas flow rate is equal to zero, the getter material is completely preserved.

The activated state of the material is variable. At minimum flow rate the sorption process can be maintained by the renewal of the ingot surface when the mechanical tool removes from the ingot surface only the layers which have already reacted with gas. With the increase of the gas flow rate the intensity of work of the disintegrator can be increased producing fresh powder particles for the sorption process. At a certain milling rate the powder particles will react with the gaseous impurities before landing on the column 11, however, at an even higher milling rate a layer of fresh powder 12 will appear and grow. In the intermediate process regimes the thickness of the layer 12 remains constant, which represents the stationary state of the gas purification process.

Figure 2:
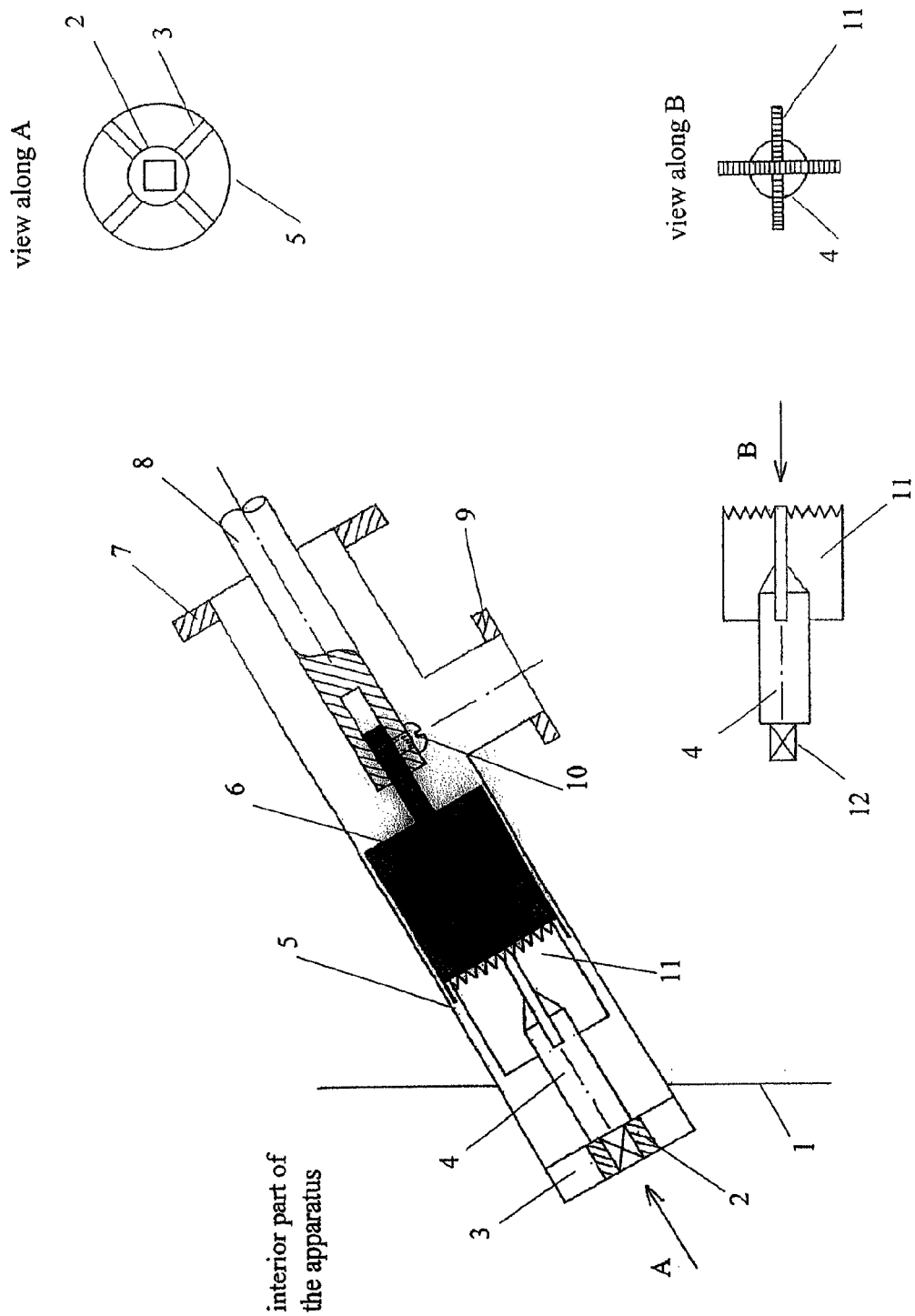

FIG. 2. An example of a disintegrator according to the present invention (a disintegrator having a declination) (see also FIG. 4, 2'):
1—a metal wall of a sorption column, 2—a support ring with a square opening, 3—a bridge between ring 2 and a wall of the casing 5, 4—a shank, 5—a metal wall of the casing, 6—a crucible with an ingot, 7—a flange for connecting to a flange of a feedthrough, 8—a shaft of a feedthrough, 9—a flange of an assembly opening, 10—a screw, 11—cutting or scratching plates of a tool, 12—a square shank end.

The wall 5 is tightly welded to the wall 1, and the ring 2 is connected by the bridges 3 with the wall 5. The crucible 6 has a protrusion out of the bottom, which serves for the fixing of the crucible on the shaft 8. The shaft 8 has for this purpose a channel for the crucible protrusion. The disintegrator is prepared for work in the following way. The mechanical instrument is introduced into the casing 5 with the shank down, so that its square end can enter the opening of the ring 2. Then the crucible 6 is inserted into the casing 5 bringing the ingot into contact with blades 11. The shaft 8 is inserted into the casing 5 and the flange 7 is connected with the flange of the feedthrough (not shown) taking care that the protrusion of the crucible enters the channel of the shaft 8. Finally, using the screw 10 the crucible 6 is fixed on the shaft 8 and the flange 9 is hermetically closed with the blank.

The "teeth" on the mechanical milling tool are shown in a way to indicate the place where the cutting edges are situated and are not representing their real geometry.

Figure 3:
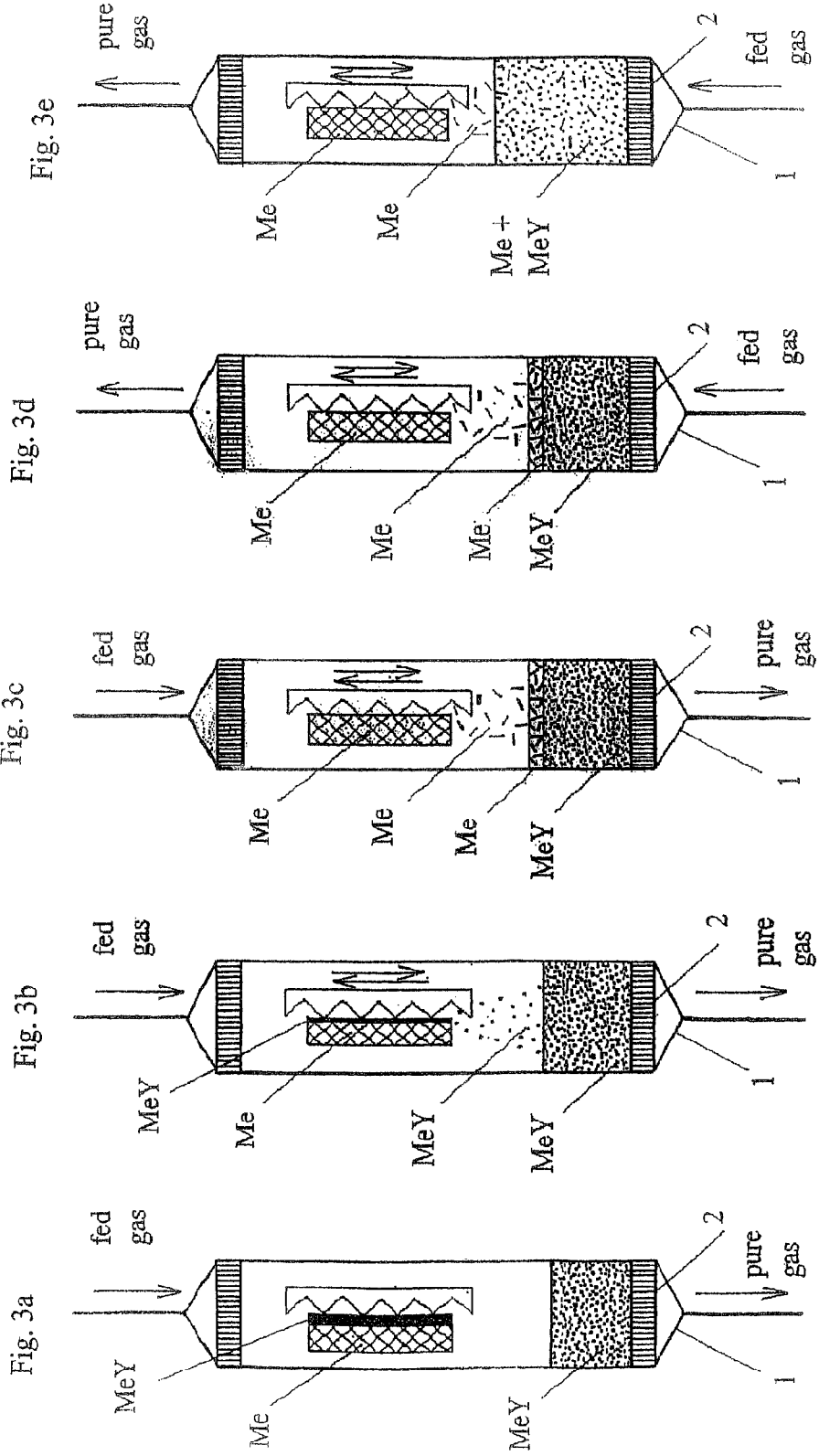

FIG. 3. The main regimes of purification of gas streams in apparatuses of mechanochemical type:

1—a gas impermeable casing of the apparatus, 2—a filter for trapping solid particles.

(a) The stand-by regime: the milling instrument does not work, the material is not activated. If the sorption material is a reactive alloy, then its behavior is described by the term quasi passivation [K. Chuntonov, US Patent Application 20110217491, Sep. 8, 2011], meaning that the sorption process runs with a very slow rate due to the diffusion of the reagents through the layer of the products MeY growing on the surface of the ingot. Sorption with such a slow rate can satisfy the requirements for maintaining a status quo in tightly sealed vacuum or gas-filled chambers, but does not suit the case of a flow (in-line) gas purifier. An activated state of the purification material with different degrees of activation is shown in FIG. 3 in the positions from (b) to (e).

(b) The regime of "a pure ingot": the mechanical instrument continuously removes thin. MeY layers from the ingot surface renewing in this way the sorbing surface. This is a regime of purification with low flow rates.

(c) The regime of dynamic stratification: the intensity of milling is increased to an extent that a layer of fresh Me particles is formed on top of the powder column below which the particles of the reacted material MeY are situated. There is no pronounced borderline between the layers of Me and MeY; it is diffuse and gradually moves up together with the growth of the total powder mass.

Generally, the given regime refers to the average values of the flow rates.

(d) The inverted regime: the gas flows not from above downward but from below upward. Given the chemical heterogeneity of the powder in the column along its height, the sequence of the powder layers passed by the gas on its way can change as compared with the case of (c).

(e) The regime of fluidized bed: at a strong pressure of the gas coming from below the entire powder mass is set into movement. The distance between the particles increases; they collide with each other and mix averaging the chemical composition of the powder column. At this regime the purification process runs fastest.

Figure 4:
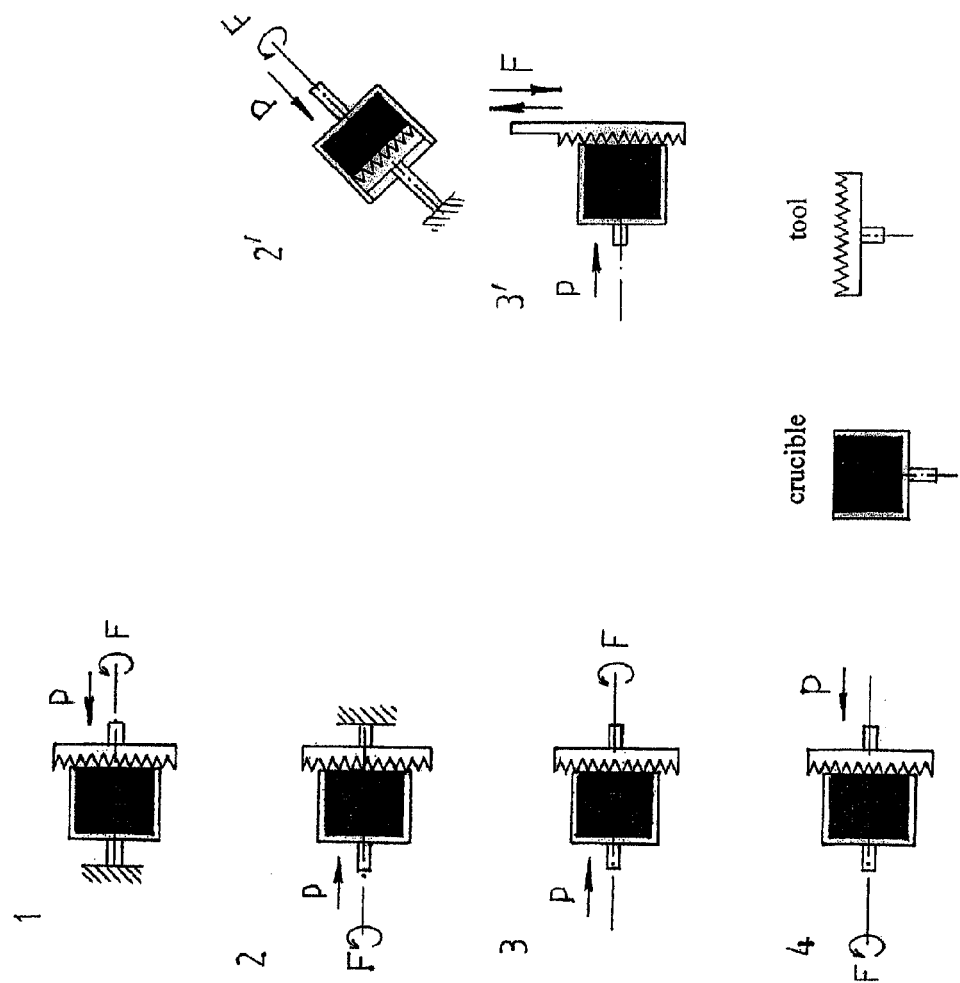

FIG. 4. The possible combinations of mechanical forces for the case with a horizontal position of the crucible

1—a crucible (with an ingot) is fixed, the forces P and F are applied to the tool; 2—the forces P and F are applied to the crucible, the tool is fixed; 3—the force P is applied to the crucible, the force F to the tool; 4—the force F is applied to the crucible, the force P to the tool; 2'—the tool is fixed and is situated inside the crucible tube, forces P and F are applied to the crucible (see also FIG. 1); 3'—the force P is applied to the crucible, the force F to the tool, which is performing a linear reciprocating motion. The same schemes are applicable for the case when the crucible axis is vertical.

V. DESCRIPTION

The new sorption apparatuses according to the present invention are operated by mechanical milling of the purification material. The processes occurring in this type of operation combine the in situ and in statu nascendi conditions.

Mechanical milling of an ingot in a cold state not only increases the total surface area of the material but also improves the reactivity of the newly created surface due to the appearance of a variety of defects. These defects are concentrated on the surface of the powder particles as well as on the near-surface layer of a certain thickness at the ingot. The excess energy accumulated in the material during the deformation in the form of mechanical tensions, broken bonds and structural and electronic defects lowers the temperature threshold of chemical reactions and speeds up diffusion processes. The appearance of a large number of new active sites ("hot spots") leads to faster rates of the reactions and allows to run endothermic reactions without heating. Practically this means that the as-prepared powders of specially selected alloys can capture also gases with low reactivity like nitrogen, methane and others even at room temperature.

Another achievement of the new method is the controllable character of the purification process itself. Dosed milling of an ingot, where the rate of the production of the fresh powder and its supply to the reaction zone are adjusted to the real need at any given moment, changes the entire technology: the process can be stabilized within the set frames, and the safety of handling and the protection of the active sorbents increase dramatically. The concept is exemplified for an apparatus shown schematically in FIG. 1.

In the instrumental respect the given technology is rather simple: the lower part of the sorption column 1, through which the purified gas X containing impurities Y is flowing, features column 11 containing the used product of the composition MeY, and a thin layer 12 of powder Me on the top. Powder particles 13 get into the reaction zone from disintegrator 2 and/or 2', operated by actuator 3 and/or 3'. The design of the disintegrator is shown in FIG. 2.

As shown in FIG. 1 the coordination of the milling rate and the flow rate of the stream of gas X is performed with the help of the feedback 6-6-6, which subordinates the speed of treatment of the ingot to the results of testing the gas phase at the exit 9 of the sorption column. Gas samples (probes) get into the analyzer 8, and the measurement data is transferred along the line 6 to the converter (controller) 7, which creates the signal controlling the operation of the motorized actuator 3'.

The described technology is effective, it guarantees minimum losses of getter material in the case of breakdowns, and it also creates the conditions under which the metallic reagent in the state of the highest chemical activity can sorb even unreactive gases.

The efficiency is defined by the fraction of the purification material, which has reacted with gases and therefore the relative sorption capacity of the material [K. Chuntonov et. al., Vacuum, 85 (2011) 755-760], which is also related to the cost efficiency of the corresponding technology.

As already shown above, in the present invention an extremely high sorption efficiency of the technology is provided by the very principle of mechanical activation of the material at its working place, i.e. by in situ generating and employing an as-made powder of sorption material. However, this efficiency is further increased thanks to the employment of highly reactive purification materials containing alkali or alkaline earth metal components. Reactive alloys sorb active gases at room or lower temperature according to a parabolic or linear law by the continuous growth of products on the surface of the alloy. This is their essential difference from transition metals like Fe, Mn, Ti, Zr, etc., which in the same temperature range stop sorbing gases after a passivated film with the thickness of some atomic layers has been formed on their surface.

The special sorption mechanism of reactive alloys gives them a significant advantage over the other metal chemisorbents also with regard to the size of the powder particles. In the case of transition metals the maximum of sorption capacity can only be achieved if the average particle size does not exceed ~10 nm. Otherwise the central part of the particles remains unreacted, and thus the fraction of unused material increases with the increase of the particle size. However, the production of metallic nanoparticles is a difficult technical task and their usage in sorption columns of big volumes presents a serious problem. At the same time, experience has shown that the sorption capacity of reactive alloys is close to the theoretical limit even for powders of the usual micron level, with particle diameters from some microns to some hundreds of microns. There are well known easy and reliable methods of mechanical milling of solids, and this fact is the decisive argument in favor of reactive alloys allowing to achieve high sorption efficiency by easily available means.

The new technology according to the present invention also successfully solves the safety problems and related issues associated with any contact of the purification material with air or reactive gases. Alloys with a dense monolithic structure are sufficiently stable to the usual atmosphere if the time of exposure to the air is only short, since the surface of the reactive ingot is immediately covered with a thin layer of reaction products, which abruptly decreases the sorption rate. This layer can subsequently easily be removed with the mechanical instrument.

The powder part of the purification material is not endangered by the air getting inside the apparatus. In contrast to conventional gas purifiers (see e.g. the corresponding products by Entegris, NuPure, etc.), where the entire active powder mass is immediately disabled in the breakdown situation, the new apparatuses with the controlled feeding of the powder into the reaction zone lose in such cases a very small amount of as-grinded particles as the main part of the powder already consists of the particles that have reacted to stable products.

Still another difference of the new method from the current technologies of production of pure gases consists in the diversity of its variants, i.e. the existence of several purification regimes corresponding to different ranges of process parameters:

Mechanochemical treatment of the sorption material directly in the medium of the gas to be purified is universal; it is applicable to practically all gases and in any of their states, both liquified and gaseous, at high pressures and at low pressures including vacuum. It is natural that as the scope of applications is vast it is not possible to reach optimum performance without considerably different design solutions, some of which are adjusted for low temperatures at normal pressure and others for high pressures at room temperature, etc. In the given context it is important to point out that the diversity of variants is not identical to the differences in design and is not connected to them, but on the opposite, is the common feature of all the new apparatuses, a feature, which shows itself in the high variability of the sorption process itself.

Depending on the conditions of the activation process some clearly distinguishable technological processes appear upon a smooth regulation of the process parameters within each of the regimes. Let, for example, the gas enter the sorption column from the top down (FIG. 3, $a$). If the actuator is switched off the remains of the fresh powder turn into particles MeY, and then the process can continue only with a very low rate according to the slow growth of products on the ingot surface below the impeding layer of the composition MeY (FIG. 3, $a$). Such a regime is of no interest for gas purification purposes and it can be called for this reason a stand-by regime. The losses of sorption material at this regime are negligibly small.

For starting the gas purification regime, the material has to be brought to the activated state. The first suitable regime comes down only to the removal of the used MeY layers from the ingot surface (FIG. 3, $b$). The continuously renewed surface is in this case the main sorption agent and the powder produced by the mechanical treatment from the beginning has the composition MeY. Using the milling process control system (FIG. 1) it is possible to regulate the rate of gas purification in the ranges defined by the Yelovich equation $d\theta/dt = A\exp(-b\theta)$, where $\theta$ is coverage, t is time, A and b are constants [A. W. Adamson. Physical Chemistry of Surface, John Wiley & Sons, New York, 1982]. The maximum purification rate in such a regime is reached at $\theta=0$, and if $\theta=1$ the regime becomes a stand-by regime. By increasing the intensity of work of the milling instrument the purification process can be brought to the next level, where the produced powder consists mainly or even totally of fresh Me particles (FIG. 3, $c$). Here two regimes are possible: a regime with the growing thickness of the upper powder layer Me, or a stable regime, where the thickness of the layer of the fresh Me particles does not change with time. The latter means that the rate of the entry of the impurity Y into the gas column and the rate of its sorption by the sorption material are equal. The control system (FIG. 1) allows maintaining a stabilized regime of gas purification by adjusting the rate of milling the ingot to the required values of the flow rate in a wide range.

The structure of the stratified powder mass, when the Me particles are on top and a column of MeY particles is below them, creates the prerequisites for another regime, viz. for a change of the gas stream direction. If the gas stream is inverted, that is if it is directed not from the top down (FIG. 3, $c$) but from below upwards (FIG. 3, $d$), then at the same values of the flow rate and the same rate of milling the ingot the process regime will change due to the change in the sequence of the chemical reactions. Comparing FIG. 3, $c$ and FIG. 3, $d$ it can be seen that in the first case the impurity first contacts Me particles and then MeY particles while in the second case the impurity Y first enters MeY layers and only after that the Me layer. As a result the chemical composition of the end gas product can be different.

For example, if Me is sodium and Y represents the impurities $O_2$ and $H_2O$ in the same gas, the purification of the stream according to the scheme in FIG. 3, $c$ leads to contamination of the main gas, which can be Ar, He, $N_2$ etc. with the secondary product hydrogen. However, when the mentioned gases are purified according to the scheme in FIG. 3, $d$, this kind of contamination does not take place as MeY layers (in the described example they correspond to a mixture of $Na_2O$ and NaOH) have a strong drying effect on the entering gas.

Finally, if we continue increasing the flow rate in the regime when gas is fed from below upwards (FIG. 3, $e$), the regime of fluidized bed appears, which is in many respects preferable. In this regime the gas pressure from below counterbalances the weight of the powder mass and the particles present in the suspension state are intensively mixed. The mass transfer and the chemical interaction in the system gas/particles are accelerated, in particular also due to the additional milling of the powder particles by collisions between the particles or between the particles and the walls of the apparatus. At this regime more coarse powder with a particle size of about several hundreds of microns can be supplied into the reaction zone from the disintegrator, which makes the given method still more efficient. FIG. 3, b-e allow a ranking of the activation degrees which may then correspond to a certain purification regime. The sorption rate in the regime measured via the flow rate of the pure gas is minimal when the milling instrument produces powder of the composition MeY (FIG. 3b); it increases when the product of milling are particles Me and when this powder mass is stratified (FIG. 3,c, d); and finally it reaches its limit in the regime of fluidized bed due to the turbulent motion of the suspended powder mixture Me+MeY (FIG. 3,e) in a gas stream. The basic characteristics of the new gas purification process can thus be formulated and summarized as follows:

activation of the sorption material by mechanical milling of the "cold" ingot in the presence of the gaseous reagents contained as impurities in the gas to be purified;

controlled milling for maintaining the process in the required regime, in particular, in a stationary regime, when the amount of the powder produced in the unit of time is equivalent in chemical respect to the amount of impurities entering the reactor during the same unit of time;

using reactive alloys with a textured monolithic structure produced by directional solidification of their initial melt as sorption material.

A dedicated consideration of these three points allows to bring gas purification technique to a qualitatively new level, far surpassing in its operational parameters everything known about sorption methods using sorption materials.

The superiority of dynamic mechanochemistry over the existing methods of obtaining super pure gases is not only due to the sorption performance but also regarding the economic aspects of the entire technology. The general simplicity of the apparatuses as well as the low consumption of materials in the new process, and their safe and convenient production, are obvious advantages.

The combination of the super reactivity of the fresh powders with the high protection of the purification material from the environment is achieved by a simple design of the apparatus and by the special structure of the ingot. The sorption column (if we describe it without a process control system) contains only a few parts (FIG. 1): a casing impermeable for gas, ports for connection to the gas line, filters for keeping loose solid particles inside the column, and a disintegrator, which is the source of the superactive powder. Equally evident are the advantages of the metallurgical solutions: instead of high porosity getter materials obtained by a long multistage treatment of the getter product, in the present case the initial material is a macrohomogeneous ingot with a dense monolithic structure formed in the process of fast directional solidification of the melt. The dense structure of the ingot provides it with the stability to contacts with air, which porous structures permeable for gas do not possess. The casing of the sorption column, for convenience in production or in operation, can be made detachable in the form of two departments connected with the help of flanges via a metallic gasket. As for filters, any of the common porous materials, metallic, ceramic, etc., can be employed.

There can be one or several disintegrators (FIG. 1). An apparatus with several disintegrators gives a unique possibility to introduce into the reaction zone several metals, which are complementary in their sorption characteristics, but cannot be produced as one ingot due to the impossibility of their direct alloying. An example of such immiscible metals can be alkali or alkaline earth metals on the one hand and self-passivating transition metals like Nb, Ti, V, etc., on the other hand.

A disintegrator includes an ingot with or without a crucible, a mechanical milling tool and an actuator setting the ingot or the tool in motion (FIG. 2). Mechanically strong and easily passivating ingots of transition metals and their alloys can be mounted in the disintegrator without a crucible. Reactive ingots with a high concentration of reactive metals and a low mechanical strength are fixed inside the disintegrator together with a crucible. In special cases when requirements to the purity are higher than usually, the free surface of the ingot can be coated with a temporary protective layer of a stable metal, e.g. by thermal deposition straight after the growth process is completed.

Ingots are grown with a relatively high rate by the method of vertical directional solidification of the melt in tube crucibles under argon or in metallic ampoules sealed under vacuum [see K. A. Chuntonov et al., J. Less Common Metals, 1982, Vol. 83, pp. 143-153.]. During the solidification in a steady-state regime a product with pronounced axial texture and constant chemical composition along the ingot is formed. These are the important characteristics of the ingot facilitating dimensional uniformity of the produced powder and stabilization of the sorption process in time.

In principle, there are no restrictions concerning the nature of the milled materials except that it should be indifferent towards the purified gas and, on the contrary, should have a strong chemical affinity to the impurity to be removed. These can be oxides, salts, metals and other substances; however, in the present invention the preference is given to alloys, and in particular to reactive alloys. Independent of the general elemental composition of the reactive alloy, the concentration of the reactive component in it should be high and the melting temperature should be low. Alloys satisfying these requirements, besides their high sorption capacity and obvious other technological advantages, are also characterized by low mechanical strength and are easily destroyed mechanically.

In particular, eutectics on the basis of reactive metals, i.e. eutectics having a reactive metal as one of its phase constituents as well as low-melting intermetallic compounds $Me_nM$, where Me is a reactive metal, M is any second metal and $n \geq 1$, belong to this kind of alloys. Under low-melting it is understood that the melting point of $Me_nM$ is not higher than ~600° C. Eutectic Ba—35 at % Mg or the intermetallic compound $Ba_{10}Ga$ can serve as examples for materials suitable for purification of noble gases from of all kinds of impurities. The intermetallic compound $CaLi_2$ is the material of choice for the purification of hydrogen, and on the contrary, eutectic Mg—12 at % Ni or the intermetallic compound $CuMg_2$ for removal of hydrogen from gas mixtures, etc.

Any suitable standard or specially developed tool can be used as an instrument for milling metal ingots into powder with a particle size from a micron to some hundreds of micron. These can be drills, cutters, files, scrapers, metallic brushes, etc.

The transmission of motion from the outside motorized actuator to parts inside the apparatus can be carried out in different ways, from which, naturally, only those are acceptable that do not cause seal failure of the sorption column. Linear and/or rotary motion from the outside can be produced with the help of linear and rotary feedthroughs if the gas pressure in the sorption column does not exceed several bars. Other mechanisms can also be used, e.g. combinations of a screw with a bellow or a diaphragm, rotating magnetic fields created by an outside source, etc. An inside agent, e.g. the compressed purified gas itself, can also serve as a source for the motion. In this case, which is typical for high pressure gas lines, part of the energy of the gas stream before entering the reaction zone is transformed (with the help of an inside turbine or a cylinder with a piston) into rotary or linearly reciprocating motion of the tool.

Some variants of the milling process are shown schematically in FIG. 4, where the pressing force P is applied to the member of the pair ingot/tool which is able to perform linear motion along its axis and the carrier of the tangential force F is the member performing rotary motion. If the crucible is not to be milled together with the ingot, then the diameter of the instrument should be smaller than the inside diameter of the crucible (variant 2') and the crucible itself should have a declination downwards (FIG. 4). Rotary movement can be replaced by linear motion (variant 3'), where a file or a metallic brush or a scraper is used instead of a drill or a cutter.

From the given examples it is obvious that mechanochemical activation of reactive alloys is the solution of choice, which allows to achieve the above claims, i.e. the development of a new method of sorption purification of gases excelling the modern technologies of production of super pure gases both in economical respect and in technical efficiency. The new sorption apparatuses are simple in construction; the initial sorption material in the form of directionally solidified ingots is a cheap product and the powder obtained by its mechanically milling is an ideal gas sorbent. This activated reactive powder shows extremely high sorption capacity at room temperature to allow an exceedingly rapid reaction with gas impurities at any flow rate used in gas purification practice.

The controlled character of the gas purification process in its mechanochemical embodiment is yet another innovation for which there are no analogues in the apparatuses currently in use. The control is realized at room temperature by simply regulating the rate of milling of the ingot in the given frame of the production regime.

The most attractive of the new opportunities in the gas purification field is the regime combining the two most effective ways of running a chemical processes in gas/solid systems at normal temperature, namely, the fluidized bed technique and the mechanochemical activation of solids (FIG. 3, e). When reactive purification material is used in this regime, the theoretical limit of sorption efficiency is reached within a minimum of time.

Although the above Description concerns mainly the mechanochemical stimulation of reactions in gas/solids systems at normal temperature, the same sorption method is suitable also for the purification of liquified gases and for many liquids in the temperature range from room to cryogenic temperatures where chemical interaction of mechanically activated alkali and alkaline earth metals with organic or inorganic substances is still possible.

The invention claimed is:

1. A sorption apparatus for gas purification consisting of a vertical flow column with gas tight walls, inlet and outlet filters, and a disintegrator producing reactive powder in the medium of the gas to be purified at ambient temperature, i.e. without forced heating or cooling.

2. A sorption apparatus according to claim 1, where the disintegrator contains a mechanical milling instrument, an ingot of a reactive alloy with a continuous monolithic structure, and an actuator for performing the mechanical work.

3. A sorption apparatus according to claim 1, equipped with a feedback system for stabilization of the parameters of the purification process by controlling the milling rate.

4. A process of sorption purification of a gas flow using a sorption apparatus according to claim 1, where the disintegrator contains an ingot and the reactive powder is produced in situ and in statu nascendi by mechanical milling of the ingot with a continuous monolithic structure in the medium of the gas to be purified at ambient temperature.

5. The process according to claim 4, where the parameters of the purification process are regulated by changing the milling rate of the ingot.

6. The process according to claim 4, where the parameters of the purification process are stabilized at a set level by aid of feedback.

7. The process according to claim 4 allowing to perform any change of the purification regime by changing the ingot composition, the direction and rate of the gas stream in the column, or the intensity of milling the alloy without terminating the general process.

8. The process according to claim 4 where, while feeding the gas flow into the column from below, the flow rate is brought to the value at which the regime of fluidized bed is reached with a maximum output capacity and purification efficiency.

9. A sorption apparatus according to claim 2, equipped with a feedback system for stabilization of the parameters of the purification process by controlling the milling rate.

10. A process of sorption purification of a gas flow using a sorption apparatus according to claim 2, where the reactive powder is produced in situ and in statu nascendi by mechanical milling of the ingot with a continuous monolithic structure in the medium of the gas to be purified at ambient temperature.

11. The process according to claim 10, where the parameters of the purification process are regulated by changing the milling rate of the ingot.

12. The process according to claim 10, where the parameters of the purification process are stabilized at a set level by aid of feedback.

13. The process according to claim 10 allowing to perform any change of the purification regime by changing the ingot composition, the direction and rate of the gas stream in the column, or the intensity of milling the alloy without terminating the general process.

14. The process according to claim 10 where, while feeding the gas flow into the column from below, the flow rate is brought to the value at which the regime of fluidized bed is reached with a maximum output capacity and purification efficiency.

15. A sorption apparatus according to claim 2, where the ingot of reactive alloy is a product of directional solidification of melt with the help of vertical method of growth in ampoules.

16. A sorption apparatus according to claim 4, where the ingot consists of eutectic or of intermetallic compound, which melt at the temperature not higher than 600° C. and contains not less than 50 at % of reactive metal: alkali, alkaline-earth or chemically active rare-earth metal.

17. A sorption apparatus according to claim 3, where the product of milling of reactive metal in the processes of controlled gas purification is powder with particle size from ~1 micron to some hundreds of microns.

* * * * *